May 8, 1923.
E. D. TILLYER
EYE TESTING INSTRUMENT
Filed July 17, 1919
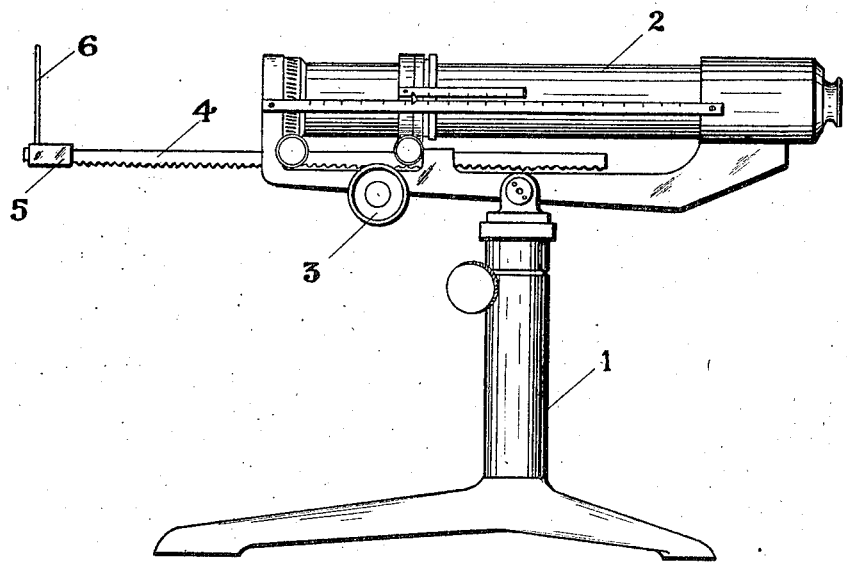
FIG. I
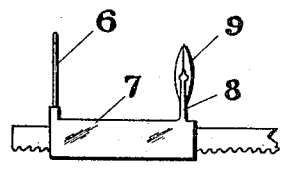
FIG. II
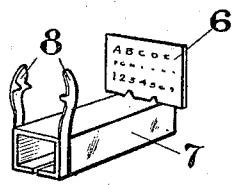
FIG. III
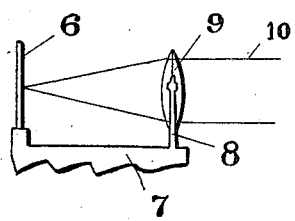
FIG. IV
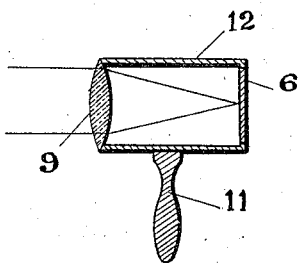
FIG. V
INVENTOR
EDGAR D. TILLYER
BY
*H. H. Styll* *H. H. Parsons*
ATTORNEYS Patented May 8, 1923.

1,454,774

UNITED STATES PATENT OFFICE.

EDGAR D. TILLYER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

EYE-TESTING INSTRUMENT.

Application filed July 17, 1919. Serial No. 311,409.

*To all whom it may concern:*

Be it known that I, EDGAR D. TILLYER, a citizen of the United States, residing at Southbridge, in the county of Worcester and State of Massachusetts, have invented certain new and useful Improvements in Eye-Testing Instruments, of which the following is a specification.

This invention relates to improvements in eye testing and has for its leading object the provision of novel and improved means for the testing of eyes by which the necessity of considerable distance for positioning of the distance test chart may be eliminated.

In the testing of vision it is customary to conduct the tests both for near and for reading distance, and also for far vision, the test for far vision being ordinarily conducted with the test chart at a distance of between fifteen and twenty feet from the patient. Prior to my invention it has been customary in conducting this test to place the chart at the opposite end of a room of the required length, or if the office were not of the required length, to place the chart in reversed form on the wall behind the patient and secure the effect of distance by a mirror in front of the patient, the reflection being thus placed at the required distance.

It is the purpose of my invention to eliminate the difficulties experienced in securing the proper distance by providing means enabling the distance test to be properly performed within the same space limits as the near test ordinarily is. While I have particularly illustrated my invention as applied to a dioptrometer it will be understood that it is equally applicable to other forms of eye testing instruments or by itself without any instrument, if preferred, and will produce equally satisfactory results in any case.

Figure I represents a side elevation of an instrument on which my device is adapted to be employed.

Figure II represents a fragmentary view of a portion of the instrument with my device applied thereto.

Figure III represents a perspective view of one embodiment of my invention.

Figure IV represents a diagrammatic view illustrating the operation of the device.

Figure V represents a sectional view of another form thereof.

In the drawings, the numeral 1 designates the standard of a dioptrometer having the lens tube 2, the operating handle 3, and the movable test card board 4, this being a well known form of instrument. The board 4 is provided with an adjustable slide 5, bearing the test card 6 made use of in connection ordinarily with the reading tests, the board 4 being moved back and forth and carrying with it the card.

Prior to my invention it has been customary after the near test has been performed with the test card in place on the board 4, to remove the card and direct the instrument toward a second test card located a suitable distance for far vision testing.

It is the purpose of my invention to eliminate the necessity of using a distant chart in connection with the instrument and to make the instrument compact and self-contained. In the accomplishment of this result in one form of my invention I may make use of the sleeve 7 adapted to be placed on the board 4 and movable therealong, as was the sleeve or carrier 5, or I may substitute the sleeve 7 for the previous sleeve 5. It will be noted that the sleeve 7 is illustrated as bearing at its forward end the lens clip or holder 8 and at its rear end bears the test card 6. In use for near work the lens 9 is removed from the holder 8 and the chart used in the ordinary manner. When it is desired to test for the distant or far vision, the lens 9 is inserted and, as shown in Figure IV, the lens is of such power and so disposed that the emergent rays 10 from the test card or chart passing through the lens will be in parallel relation, thus projecting the image of the test card to infinity, the test then being entirely independent of the distance at which the card 6 is set or the fact that the card moves in and out with different adjustments of the instrument.

In explanation of the theory here employed attention is invited to the fact that the reason for projecting the image to infinity is that when the rays coming from the test card are parallel the size of the object will remain constant irrespective of the distance at which it is placed. In testing for distant vision it is ordinarily customary to use a certain standard distance, as for instance twenty feet, and have the size of the various letters calculated for that distance, the greater the distance, the more nearly parallel effect of rays being produced corresponding to the vision directed toward distant objects in nature. With my improvement the interposition of the lens in question produces from the test card the effect of the necessary sized letters placed at a distant point and has the additional advantage that the combined lens and test card may be moved toward or away from the eye as desired without in anywise affecting the result of the test on account of the parallelism of the image bearing rays.

While my device is, therefore, particularly adapted for use in connection with an instrument such as illustrated, it will be understood that the same principle here involved may be utilized in various forms, including the structure illustrated in Figure V, in which is shown a skeleton holder comprising the handle 11 and skeleton frame 12, which bears at one end the test card 6 and at the other the suitable lens 9, thus producing a hand card for distant test purposes adapted to be used in substantially the same way that it has been customary to make reading tests in the past.

I claim:

1. In an instrument of the character described, the combination with the instrument proper of a slidable chart carrier mounted thereon, a chart bearing sleeve slidable on the carrier, and a lens carried by the sleeve in advance of the chart, said lens being of focus to project the image of the chart to infinity.

2. In an instrument of the character described, the combination with a support, of a reading test chart mounted thereon and movable with respect thereto, and a lens supported a predetermined distance in advance of the chart and movable therewith, said lens being of power to project the image of the chart to infinity.

3. An attachment for an eye testing instrument comprising a sleeve member of rectangular shape in cross section and adapted to embrace a supporting slide, said sleeve member being provided at one end with a target support and at the opposite end with a lens support whereby the sleeve may be adjusted on its carrier to position the target for near vision testing purposes, or supplied with a lens projecting the target image to infinity for distant vision testing purposes.

4. In an instrument of the character described, the combination with an adjustable carrier member movable with the instrument, of a chart holder mounted on the carrier and movable both therewith and with respect thereto, and fixed lens holding means disposed on the chart carrier a predetermined distance from the target whereby when the proper lens is placed within the holding means the image of the chart will be projected to infinity and the same may be used for distance testing purposes.

In testimony whereof I have affixed my signature, in presence of two witnesses.

EDGAR D. TILLYER.

Witnesses:
 HARRY H. STYLL,
 H. K. PARSONS.